(12) United States Patent
Zhang

(10) Patent No.: US 7,454,391 B2
(45) Date of Patent: Nov. 18, 2008

(54) SYSTEM FOR PROBLEM STATEMENT REFORMULATION

(75) Inventor: Guoming Zhang, Beijing (CN)

(73) Assignee: Iwint International Holdings Inc., Tortola (VG)

( * ) Notice: Subject to any disclaimer, the term of this patent is extended or adjusted under 35 U.S.C. 154(b) by 0 days.

(21) Appl. No.: 10/872,518

(22) Filed: Jun. 22, 2004

(65) Prior Publication Data

US 2005/0283452 A1  Dec. 22, 2005

(51) Int. Cl.
*G06F 17/00* (2006.01)
(52) U.S. Cl. .................................. 706/45; 715/762
(58) Field of Classification Search ............... 706/45, 706/12
See application file for complete search history.

(56) References Cited

U.S. PATENT DOCUMENTS

| | | | | |
|---|---|---|---|---|
| 5,018,075 | A * | 5/1991 | Ryan et al. ................... | 706/46 |
| 5,704,028 | A * | 12/1997 | Schanel et al. ............... | 345/440 |
| 6,208,955 | B1 * | 3/2001 | Provan et al. ................ | 703/20 |
| 6,369,836 | B1 * | 4/2002 | Larson et al. ................ | 715/763 |
| 6,484,155 | B1 * | 11/2002 | Kiss et al. .................... | 706/46 |
| 6,834,256 | B2 * | 12/2004 | House et al. ................. | 702/181 |
| 2002/0186238 | A1 * | 12/2002 | Sylor et al. .................. | 345/736 |
| 2004/0243532 | A1 * | 12/2004 | Steward ....................... | 706/57 |
| 2004/0249777 | A1 * | 12/2004 | Ransing et al. .............. | 706/45 |
| 2005/0114282 | A1 * | 5/2005 | Todhunter .................... | 706/50 |

OTHER PUBLICATIONS

"Isolating Cause-Effect chains from Computer Programs", A. Zeller, SIGSOFT 2002/FSE-10, Nov. 18-22, 2002, ACM.*
"TaskGuides: Instant Wizards on the Web", Doug Tidwell, Jeanette Fuccella, Oct. 1997, Proceedings of the 15th annual international conference on Computer documentation.*
"Syntactic and Semantic Problems in Automatic Sentence Generation", Kenneth E. Harper, Aug. 1967, Proceedings of the 1967 Conference on Computational Linguistics.*
"Automatic Program Generation for Processing a high level relational-like query language", A. Timothy Maness, Sue M. Dintelman, Mark H. Skolnick , Jan. 1979, Proceedings of the 1979 annual conference.*
"Using Cause-Effect Analysis to Understand the Performance of Distributed Programs", by Meira Jr. et al. Wagner Meira, Thomas J. LeBlanc, Virgilio A. F. Almeida, Aug. 1998, Proceedings of the SIGMETRICS symposium on Parallel and distributed tools.*
Robert J. Latino, "Root Cause Analysis": Quality of Process-Part 1, Reliability Center, Inc.
Robert J. Latino, "Root Cause Analysis": Quality of Process-Part 2, Reliability Center, Inc.
Robert J. Latino, "Where Does Root Cause Analysis Stop, At the How and the Why?" Root Cause Analysis: Quality of Process-Part 3, Reliability Center, Inc., Apr./May 2001.
Kauroishikawa, "Fishbone Diagram", Guide to Quality Control: 18-29, Yonatan Reshef School of Business University of Alberta,1982.

* cited by examiner

*Primary Examiner*—David R. Vincent
*Assistant Examiner*—Mai T Tran
(74) *Attorney, Agent, or Firm*—Venable LLP; Ralph P. Albrecht; Kyle D. Petaja

(57) ABSTRACT

A method and systems that allows building cause effect tree related to initial problem statement. Each event of cause effect tree can be added with additional axes: hierarchy and operation. Wizards and templates provide simplify adding of undesirable effects. System automatically generates alternative problem statements and queries for search in knowledge bases.

25 Claims, 5 Drawing Sheets

Example 1.

FISHBONE CAUSE-AND-EFFECT DIAGRAM

SYSTEM FOR PROBLEM STATEMENT REFORMULATION

FIELD OF THE INVENTION

The present invention relates to problem reformulation techniques.

BACKGROUND OF THE INVENTION

Cause-and-effect diagrams are typically used for problem reformulation and search of a root cause of an undesirable event. One of the first cause-and-effect diagrams was developed by Kauro Ishikawa of Tokyo University in 1943 and thus are often called Ishikawa Diagrams. They are also known as fishbone diagrams because of the appearance of the diagrams (in a plotted form). See, e.g., FIG. 7. Such a fishbone diagram may reflect different categories of causes. Each possible event is conventionally placed on an appropriate category line. The cause-and-effect diagram systematizes reasons by categories but does not provide a possibility to show causal links between given causes. Thus, each cause may affect one initial undesirable event, but conventionally there may be no provision to determine how multiple causes may be linked between one another.

Another conventional diagram for root cause analysis (RCA) is a cause-and-effect tree. The cause-and-effect tree may be organized in tree chains of cause and effect. Conventional tools are available and may be used to provide a logic tree structure such as, e.g., but not limited to, PROACT® Root Cause Analysis (RCA) v3.0 available from Reliability Center, Inc., of Hopewell, Va., USA. See, e.g., FIG. 8. In each tree chain, each previous event may be a cause for a next one. So, if one cause is prevented, then all next causes in the chain may be prevented as well.

SUMMARY OF THE INVENTION

An exemplary embodiment of the present invention may include a system, method and computer program product which may provide an improved way of building a cause-and-effect tree related to an initial problem statement. According to an exemplary embodiment, to each event of the cause-and-effect tree there may be added one or more additional axes. In an exemplary embodiment the additional axes may include, e.g., but are not limited to, hierarchy and/or operation. Wizards and templates may also be provided in another exemplary embodiment. The wizards and templates may simplify adding of undesirable effects. In yet another exemplary embodiment, the system may automatically generate alternative problem statements and queries for search in knowledge bases.

BRIEF DESCRIPTION OF THE DRAWINGS

An exemplary embodiment of the invention will now be described below where like reference numerals refer to similar subject matter and the left most digit of a reference numeral is indicative of the figure number of the reference numerals first occurrence. The drawings include.

DETAILED DESCRIPTION OF THE INVENTION

Figure 1:
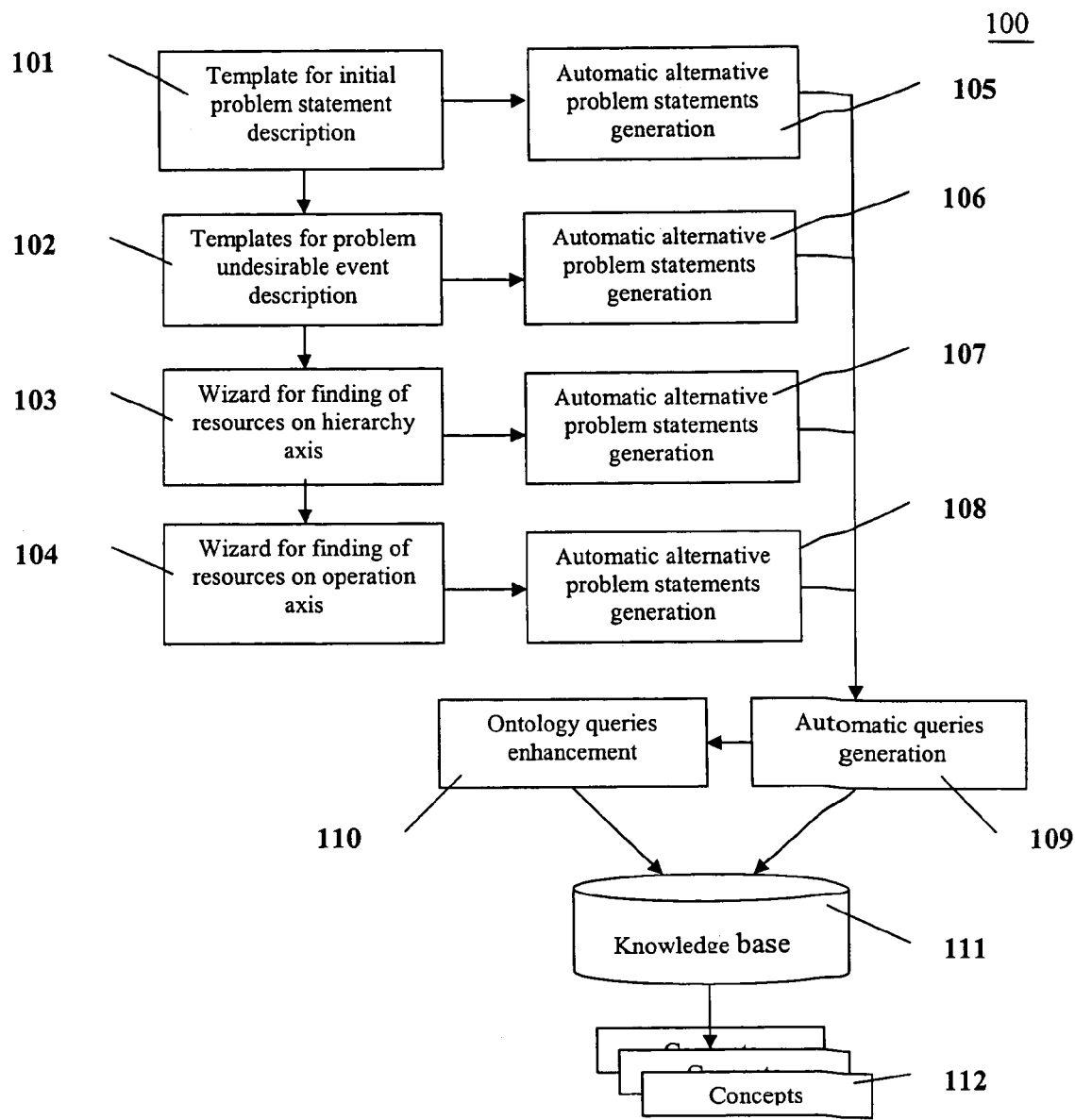
FIG. 1 shows an exemplary embodiment of a general diagram of the system according to an exemplary embodiment of the present invention.

The present invention provides a more effective way to resolve problems than conventional methods. FIG. 1 depicts a diagram 100 illustrating an exemplary embodiment of the present invention. Diagram 100 may include in an exemplary embodiment, a system including, e.g., but not limited to, a template 101 to describe an initial problem statement, means to draw a cause-and-effect chain, a template 102 for description of an undesirable event, a wizard 103 for finding resources on a hierarchical axis, a wizard 104 for finding resources on an operation axis, means (105, 106, 107, and 108) for generating automatic alternative problem statements, means (109) for generating an automatic query, means 110 for ontology queries enhancement, and a knowledge base 111.

In an exemplary embodiment, system 100 may work in the following way. The User may generate an initial undesirable situation. System 100 may contain a template for supporting, e.g., 3 types of such problems. A first type of problem may be associated with a parameter of an object and process and may be as shown in Table 1 below. A User may select one of the characteristics in (column 2), and then may formulate a parameter name (column 3) and an object or process name (column 4).

TABLE 1

| # | Characteristic | Parameter | Object or process |
|---|---|---|---|
| 1. | Excessive | Parameter name | Object or process name |
| 2. | Insufficient | | |
| 3. | Unstable | | |
| 4. | Uncontrollable | | |

A second type of problem may be described as an absence of a desirable object (or process) or presence of an undesirable object (or process) as illustrated in Table 2. The User may select a characteristic from column 2, and then may formulate the name of an object or process (column 3).

TABLE 2

| # | Characteristic | Object or process |
|---|---|---|
| 5. | Absence of | Object or process name |
| 6. | Presence of | |

A third type of problem may include an undesirable effect or process as illustrated for example in Table 3. A User may formulate an undesirable effect or process.

TABLE 3

| # | Characteristic | Object or process name |
|---|---|---|
| 7. | Undesirable | Effect name or process name |

If a template is completed, the system 100 may automatically generate one or more problems in accordance with the following rules 105:

For the problem described in Table 1:
How to decrease (for row 1) (or increase (for row 2), or stabilize (for row 3), or control (for row 4))<parameter name> of <object or process name>?

For the problem described in Table 2:
How to provide (for row 5) (remove-for row 6)<object or process name>?

For the problem described in Table 3:
How to prevent <Effect name or process name>?

After initial problem formulation, the system may prompt, in an exemplary embodiment, three alternatives to generate alternative problem statements, which may be placed on three exemplary axes: cause effects, operative and hierarchy.

If the cause-effect axis is chosen for continuation, then the system may propose a template (102 in FIG. 1) that may be similar to the template described in exemplary Tables 1, 2 and 3. In this template, the user may describe the cause of the initial problem statement.

If the cause is selected, then the system may automatically generate problems 106, in an exemplary embodiment in a similar way as described above for 105.

The system 100 may prompt again, in an exemplary embodiment, three alternatives to generate alternative problem statements, which may be placed on three exemplary axes: cause effects, operative and hierarchy.

If the user selects a super-system on the hierarchy axis, then the wizard for resource formulation may be prompted including any combination of the following:
1. Objects/processes similar to <object/process> <Next>
2. List through comma super-system elements <Back> <Next>
3. List through comma available substances <Back> <Next>
4. List through comma available energies <Back> <Finish>

The user can perform or skip any step of wizard.
Element 107 may automatically generate problem statements in accordance with following rule:
For $1^{st}$ step:
How <object/process> can prevent <text of cause>?
For $2^{nd}$ step:
How <super-system elements> can prevent <text of cause>?
For $3^{rd}$ step:
How <available substances> can prevent <text of cause>?
For $4^{th}$ step:
How <available energies> can prevent <text of cause>?

If the user selects sub-system on the hierarchy axis then the wizard for resource formulation may be prompted including any combination of the following:
1. List through comma subsystem elements <Next>
2. List through comma available substances <Back> <Next>
3. List through comma available energies <Back> <Finish>

The user can perform or skip any step of the wizard. Element 107 may automatically generate problem statements, in an exemplary embodiment, in accordance with following rule:
For $1^{st}$ step:
How <subsystem elements> can prevent <text of cause>?
For $2^{nd}$ step:
How <available substances> can prevent <text of cause>?
For $3^{rd}$ step:
How <available energies> can prevent <text of cause>?

If the user selects next or previous operations on the operation axis, then the wizard for resource formulation may be prompted including, in an exemplary embodiment, any one, or combination of:
1. List through comma components available in this operation <Next>
2. List through comma processes available in this operation <Back> <Next>
3. List through comma energies available in this operation <Back> <Next>
4. List through comma available substances in this operation <Back> <Finish>

Element 108 may automatically generate problem statements, in an exemplary embodiment, in accordance with following rule:
For $1^{st}$ step:
How <components available in this operation> can prevent <text of cause>?
For $2^{nd}$ step:
How <processes available in this operation> can prevent <text of cause>?
For $3^{rd}$ step:
How <energies available in this operation> can prevent <text of cause>?
For $4^{th}$ step:
How <available substances in this operation> can prevent <text of cause>?

User can add new causes and for each of them add new resources on the exemplary hierarchy or operation axes.

The system may accumulate all problem statements generated by units 105, 106, 107, 108. Solving of any of these alternative problems provide resolving of the initial problem.

Unit 109 may provide automatic generation of appropriate queries for each type of problem, as shown in Table 4.

TABLE 4

| Problem | Query |
|---|---|
| How to decrease (for row 1) (or increase (for row 2), or stabilize (for row 3), or control (for row 4)) <parameter name> of <object or process name>? | decrease (or increase, or stabilize, or control) <parameter name> <object or process name> |
| How to provide (for row 5) (remove -for row 6) <object or process name>? | provide (remove) <object or process name> |
| How to prevent <Effect name or process name>? | prevent <Effect name or process name> |

TABLE 4-continued

| Problem | Query |
|---|---|
| How <object/process> can prevent <text of cause>? | <object/process> prevents <text of cause> |
| How <super-system elements> can prevent <text of cause>? | <super-system elements> prevent <text of cause> |
| How <available substances> can prevent <text of cause>? | <available substances> prevents <text of cause> |
| How <available energies> can prevent <text of cause>? | <available energies> prevents <text of cause> |
| How <subsystem elements> can prevent <text of cause>? | <subsystem elements> prevents <text of cause> |
| How <available substances> can prevent <text of cause>? | <available substances> prevents <text of cause> |
| How <available energies> can prevent <text of cause>? | <available energies> prevents <text of cause> |
| How <components available in this operation> can prevent <text of cause>? | <components available in this operation> prevents <text of cause> |
| How <processes available in this operation> can prevent <text of cause>? | <processes available in this operation> prevents <text of cause> |
| How <energies available in this operation> can prevent <text of cause>? | <energies available in this operation> prevents <text of cause> |
| How <available substances in this operation> can prevent <text of cause>? | <available substances in this operation> prevents <text of cause> |

Unit 110 may include making an ontology enhancement of each query in an exemplary embodiment. Each verb of the query may be enhanced with one or more synonyms.

An example of such an exemplary enhancement for an exemplary query: decrease <parameter name> <object or process name> appears in the following Table 5.

TABLE 5

| Verb | Ontology synonyms |
|---|---|
| decrease, | diminish, lower, recede, scant, minimize, reduce, cut down, lessen, limit, shorten abridge, deplete, dilute, declaim, wane |

Enhanced queries may be sent to a knowledge base 111.

Knowledge base 111 may return a list of one or more concepts 112.

A cause effects axis describes causal relations between events. Each cause generates a next event in a chain. And on the contrary, elimination (prevention) of a cause may provide elimination of the next event in the chain (FIG. 2).

Figure 2:
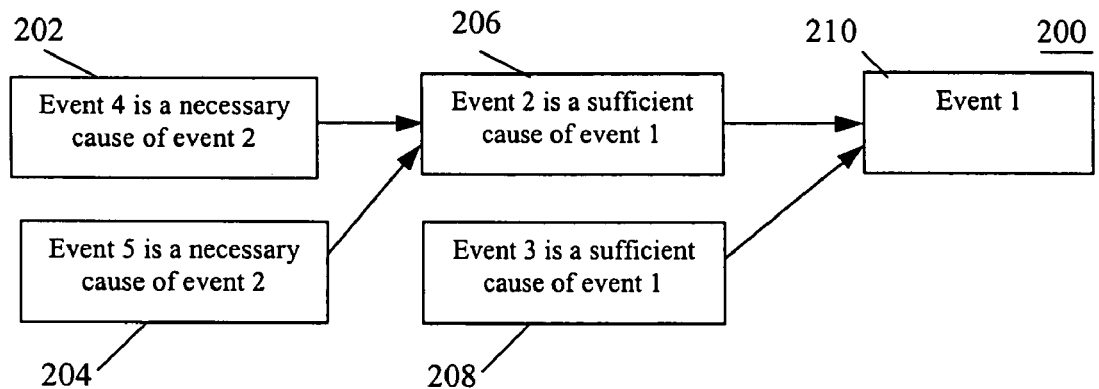
FIG. 2 shows an exemplary embodiment of a cause-and-effect chain according to an exemplary embodiment of the present invention.

FIG. 2 depicts an exemplary embodiment of an exemplary cause-effect chain 200. In the exemplary embodiment, event 4 shown in 202 and event 5 shown in 204 are two necessary causes of event 2. Furthermore, in the exemplary embodiment of chain 200, event 2 shown in 206 and event 3 shown in 208 are two sufficient causes of event 1 shown in 210. Finally, in the exemplary embodiment, elimination of event 4 or event 5 provides elimination of event 2, and elimination of event 2 and event 3 provides elimination of event 1.

Figure 3:
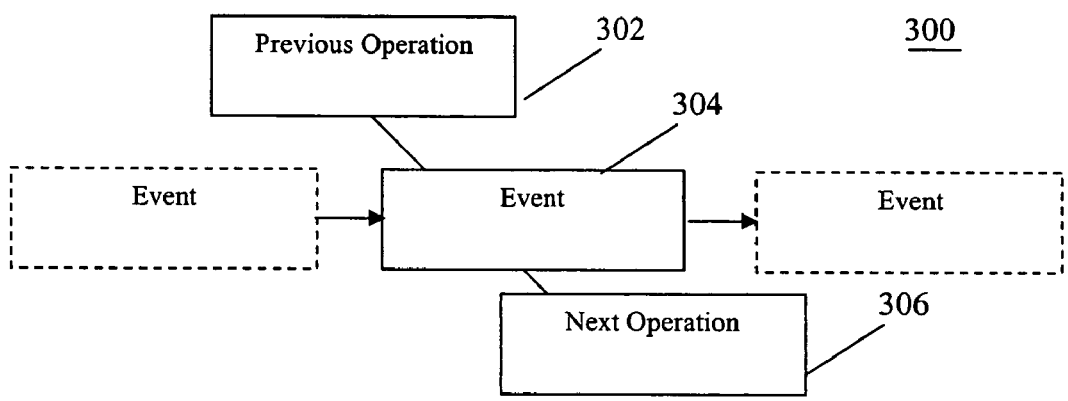
FIG. 3 shows an exemplary embodiment of an operation axis according to an exemplary embodiment of the present invention.

FIG. 3 depicts, an exemplary embodiment of an operation axis 300. In an exemplary embodiment, an operation axis may describe a previous operation 302 or a next operation 306 that may take place before or after an event 304, respectively. Operations are not linked by causal relations. Operations are used as a source of resources for elimination events.

The problems "how to use resource of operation to eliminate event?" are generated.

The user has possibility to choose any of the axes.

Figure 4:
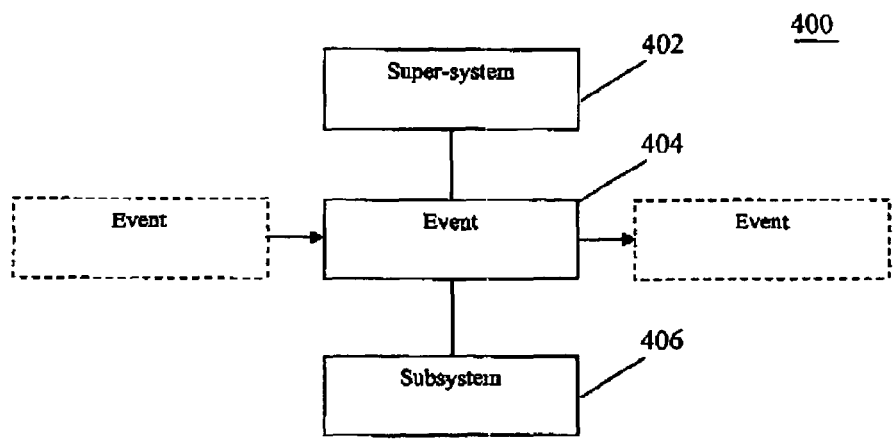
FIG. 4 shows an exemplary embodiment of a hierarchy axis according to an exemplary embodiment of the present invention.

As illustrated in FIG. 4, the hierarchy axis may contain a description of elements that may be a super-system 402 or a subsystem 406 for a selected event 404.

Super-systems 402 and subsystems 406 may be used as a source of resources for elimination events.

The problems "how to use resource of super-systems and subsystems to eliminate event?" may be generated.

The following examples are illustrative, but not limiting of the scope of the present invention. Reasonable variations, such as, e.g., those that may occur to a reasonable artisan, can be made herein without departing from the scope of the present invention.

Figure 5:
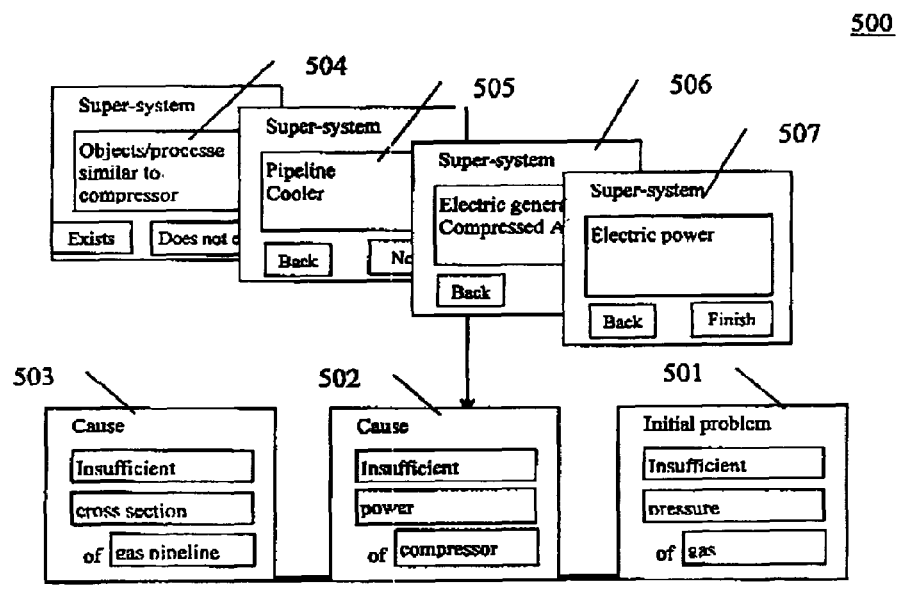
FIG. 5 shows an exemplary embodiment of a first example of a problem definition.

A user may describe a situation as an ineffectively working pneumatic cylinder. The user may enter a description of an initial undesirable situation as "insufficient pressure of gas" 501 indicating insufficient gas pressure (501, FIG. 5). Then the user may define insufficient power of compressor indicating insufficient compressor power and insufficient cross section of gas pipeline as causes of the initial undesirable situation (502 and 503). Then the user may describe super-systems for 502 using wizard steps for super-system (Table 6):

TABLE 6

| Step number | Wizard question | Wizard answer |
|---|---|---|
| 1. | Objects/processes similar to <object/process> | Does not exist |
| 2. | List through comma super-system elements | Pipeline Cooler |
| 3. | List through comma available substances | Electric Generator Compressed Air |
| 4. | List through comma available energies | Electric power |

The system may automatically generate a list of problems (Table 7, column Problem statements).

TABLE 7

| Unit number | Problem statement | Query |
|---|---|---|
| 1 | How to increase pressure of gas? | increase pressure of gas |
| 2 | How to increase power of compression? | increase power of compression |

TABLE 7-continued

| Unit number | Problem statement | Query |
|---|---|---|
| 3 | How to increase cross section of gas pipeline? | increase cross section of gas pipeline |
| 4 | — | — |
| 5 | How pipeline can prevent insufficient power of compressor? How cooler can prevent insufficient power of compressor? | pipeline prevent insufficient power of compressor cooler prevent insufficient power of compressor |
| 6 | How electric generator can prevent insufficient power of compressor? How compressed air can prevent insufficient power of compressor? | electric generator prevent insufficient power of compressor compressed air can prevent insufficient power of compressor |
| 7 | How electric power can prevent insufficient power of compressor? | electric power can prevent insufficient power of compressor |

Solving any of formulated problems may resolve the initial undesirable situation. When the user goes to the problem stage for each problem, queries may be automatically formulated (Table 7, column Queries). Each query may be ontologically enhanced (unit 110, FIG. 1) and may be sent to the knowledge base 111. Knowledge base 111 may extract concepts for a formulated initial undesirable situation.

Figure 6:
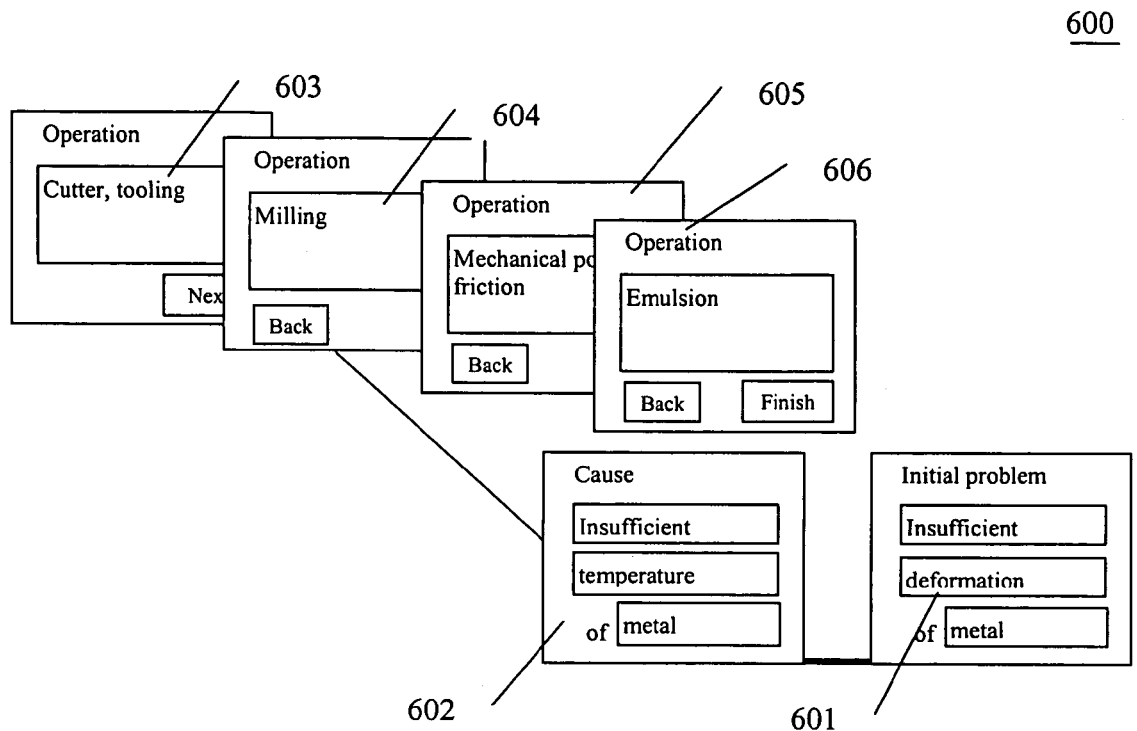
FIG. 6 shows an exemplary embodiment of a second example of a problem definition.
Figure 7:
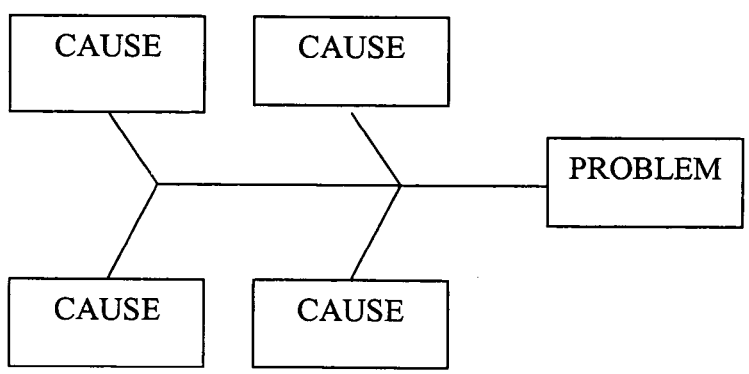
FIG. 7 shows an exemplary fish bone cause and effect diagram.
Figure 8:
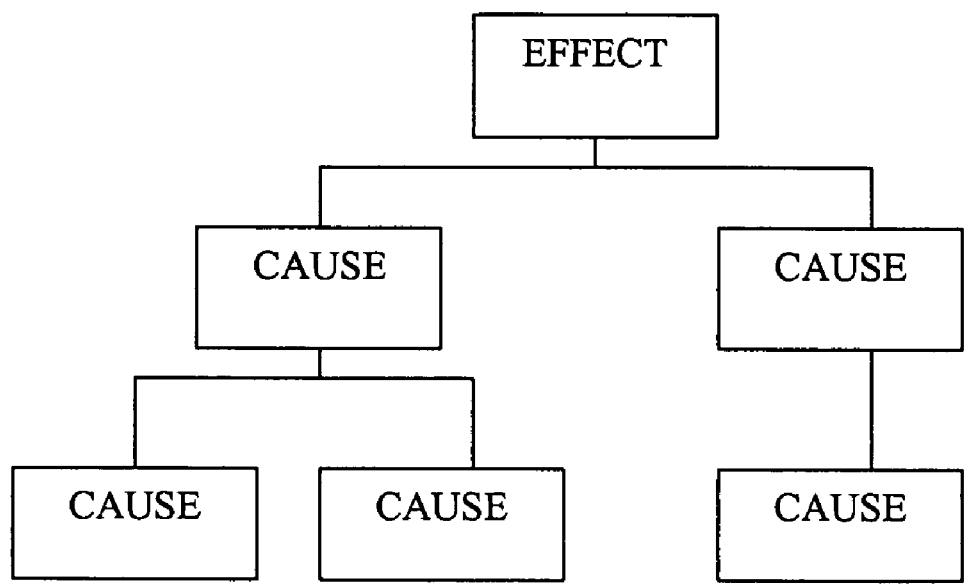
FIG. 8 shows an exemplary cause-and-effect tree.

The user may enter a description of initial undesirable situation as insufficient deformation of metal during a pressing operation (601, FIG. 6). Then the user may define insufficient temperature of metal as a cause of the initial undesirable situation (602). Then the user may describe a previous milling operation for 602 using wizard steps for operations (Table 8):

TABLE 8

| Step number | Wizard question | Wizard answer |
|---|---|---|
| 1. | List through comma components available in this operation | Cutter, tooling |
| 2. | List through comma processes available in this operation | Milling |
| 3. | List through comma energies available in this operation | Mechanical power, friction |
| 4. | List through comma available substances in this operation | Emulsion |

The system may automatically generate a list of problems (Table 9, column Problem statements):

TABLE 9

| Unit number | Problem statement | Query |
|---|---|---|
| 1. | How to increase deformation of metal? | increase deformation of metal |
| 2. | How to increase temperature of metal? | increase temperature of metal |
| 3. | How cutter can prevent insufficient temperature of metal? How tooling can prevent insufficient temperature of metal? | cutter prevent insufficient temperature of metal tooling prevent insufficient temperature of metal |
| 4. | How milling can prevent insufficient temperature of metal? | milling prevent insufficient temperature of metal |

TABLE 9-continued

| Unit number | Problem statement | Query |
|---|---|---|
| 5. | How mechanical power can prevent insufficient temperature of metal? How friction can prevent insufficient temperature of metal? | mechanical power prevent insufficient temperature of metal friction prevent insufficient temperature of metal |
| 6. | How emulsion can prevent insufficient temperature of metal? | emulsion prevent insufficient temperature of metal |

Solving any of the formulated problems may resolve the initial undesirable situation. When the user goes to the problem stage for each problem, queries may be automatically formulated (Table 9, column Queries). Each query may be ontologically enhanced (unit 110, FIG. 1) and may be sent to knowledge base 111. Knowledge base 111 may extract concepts for the formulated initial undesirable situation.

I claim:

1. A system for obtaining solution suggestions for a problem related to at least one of mechanical hardware design, manufacturing, or maintenance comprising:

a computing device formulating a problem statement of the problem on a computer graphical user interface (GUI), wherein the problem is related to at least one of mechanical hardware design, mechanical hardware manufacturing, or mechanical hardware maintenance and generating a computer displayable graphical representation of a first plurality of graphical polygons representing a cause-and-effect chain on a cause-and-effect axis based on said problem statement, said problem statement being displayed on said GUI for user interactive access, said computing device including a computer-based wizard providing a resource formulation for the problem statement, wherein said computer-based wizard provides a computer displayable graphical representation of a second plurality of graphical polygons representing at least one of an additional axis or a template, said at least one of an additional axis or template comprising at least one of a hierarchy axis or an operation axis, said hierarchy axis describing resources of at least one of a super-system or a subsystem, said additional axis or template being used to generate an alternative problem statement, said alternative problem statement also being displayed on said GUI for user interactive access, wherein said computer-based wizard finds said resources of at least one of the super-system or the subsystem, said resources including at least one of an object, an element, a substance or an energy, wherein said resources are used to prevent a cause in said cause-and-effect chain, wherein said computer-based wizard finds said resources in at least one of a previous operation or a next operation, said resources including at least one of a component, process, substance or energy, wherein said resources are used to prevent a cause in said cause-and-effect chain, said computing device generating a computer formulated query based on said cause-and-effect chain and said alternative problem statement to obtain said solution suggestions.

2. The system in accordance with claim 1, wherein said additional axis comprises said operation axis that describes resources of at least one of a previous operation or a next operation.

3. The system in accordance with claim 1, wherein said template describes at least one of an initial problem situation or a necessary and sufficient event causing said initial problem situation.

4. The system in accordance with claim 1, wherein said template describes at least one of an initial problem situation or several necessary and sufficient events causing said initial problem situation.

5. The system in accordance with claim 1, wherein said template describes at least one of an initial problem situation or several sufficient events causing said initial problem situation.

6. The system in accordance with claim 1, wherein said cause-and-effect chain performs automatic problem statement generation.

7. The system in accordance with claim 1, wherein said cause-and-effect chain performs automatic query generation.

8. The system in accordance with claim 1, further comprising:
a database that receives said query and identifies a search result based on said query relating to said problem statement.

9. A method of obtaining solution suggestions for a problem related to at least one of mechanical hardware design, manufacturing, or maintenance comprising:
receiving, at a computing device, a computer displayable graphical representation of a first plurality of graphical polygons indicating a problem situation wherein the problem situation is related to at least one of mechanical hardware design, mechanical hardware manufacturing, or mechanical hardware maintenance;
applying a template to the problem situation to generate a computer displayable graphical representation of an initial problem statement;
providing a computer displayable graphical representation of said first plurality of graphical polygons of a cause formulation on a cause-and-effect axis to generate a first problem statement based on said initial problem statement;
providing a computer-based wizard that adds a second plurality of graphical icons representing an additional axis to generate an alternative problem statement based on said initial problem statement, said additional axis comprising at least one of a hierarchy axis or an operation axis, said hierarchy axis describing resources of at least one of a super-system or a subsystem, wherein said computer-based wizard finds said resources of at least one of the super-system or the subsystem, said resources including at least one of an object, an element, a substance or an energy, wherein said resources are used to prevent a cause in said cause-and-effect chain,
wherein said computer-based wizard finds said resources in at least one of a previous operation or a next operation, said resources including at least one of a component, process, substance or energy, wherein said resources are used to prevent a cause in said cause-and-effect chain;
providing a computer displayable graphical representation of said second plurality of graphical polygons, for an additional problem formulation based on said additional axis, said alternative problem statement displayed for user interactive access on a computer-based graphical user interface (GUI); and
providing a computer formulated query based on said cause formulation and said additional problem formulation to obtain said solution suggestions.

10. The method in accordance with claim 9, wherein said operation axis comprises at least one of a next operation or a previous operation.

11. The method in accordance with claim 9, further comprising:
adding at least one of a next operation; or a previous operation for the problem statement.

12. The method in accordance with claim 9, further comprising:
adding at least one of said super-system or said subsystem for the problem statement.

13. A machine readable medium that provides instructions for obtaining solution suggestions for a problem related to at least one of mechanical hardware design, manufacturing, or maintenance, which when executed by a computing platform, cause said computing platform to perform operations comprising a method of obtaining solution suggestions for said problem comprising:
providing a computer displayable graphical representation of a first plurality of graphical polygons representing a cause formulation of a problem statement, wherein the problem statement is related to at least one of mechanical hardware design, mechanical hardware manufacturing, or mechanical hardware maintenance, on a cause-and-effect axis;
providing a computer displayable graphical representation of a second plurality of graphical polygons representing an additional problem formulation of the problem statement based on an additional axis, wherein said additional axis comprises at least one of a hierarchy axis or an operational axis, said hierarchy axis describing resources of at least one of a super-system or a subsystem;
providing user interactive access to said problem statement by displaying said problem statement on a graphical user interface (GUI);
providing a computer-based wizard for providing a resource formulation for the problem statement wherein said computer-based wizard finds said resources of at least one of the super-system or the subsystem, said resources including at least one of an object, an element, a substance or an energy, wherein said resources are used to prevent a cause in said cause-and-effect chain,
wherein said computer-based wizard finds said resources in at least one of a previous operation or a next operation, said resources including at least one of a component, process, substance or energy, wherein said resources are used to prevent a cause in said cause-and-effect chain; and
providing a computer formulated query based on said cause formulation and said additional problem formulation to obtain said solution suggestions for said problem.

14. The machine-readable medium of claim 13, the method further comprising:
adding at least one of a next operation; or
a previous operation for the problem statement.

15. The machine-readable medium of claim 13, the method further comprising:
adding at least one of said super-system, or said subsystem for the problem statement.

16. A method for obtaining solution suggestions for a problem related to at least one of mechanical hardware design, manufacturing, or maintenance, comprising:

generating a computer displayable graphical representation of a computer formulated problem statement based on a problem situation wherein the problem situation is related to at least one of mechanical hardware design, mechanical hardware manufacturing, or mechanical hardware maintenance;

generating a computer displayable graphical representation of a problem statement on a cause-and-effect axis based on said problem statement, comprising a first plurality of graphical polygons;

generating a computer viewable graphical representation, via a computer-based wizard, of an alternative problem statement on a second axis based on said problem statement, comprising a second plurality of graphical polygons, wherein said second axis comprises at least one of a hierarchy axis or an operation axis, said hierarchy axis describing resources of at least one of a super-system or a subsystem, wherein said computer-based wizard finds said resources of at least one of the super-system or the subsystem, said resources including at least one of an object, an element, a substance or an energy, wherein said resources are used to prevent a cause in said cause-and-effect chain, wherein said computer-based wizard finds said resources in at least one of a previous operation or a next operation, said resources including at least one of a component, process, substance or energy, wherein said resources are used to prevent a cause in said cause-and-effect chain;

generating a computer formulated query based on said problem statement and said alternative problem statement;

transmitting said computer formulated query to a database; and receiving a search result from said database based on said query relating to the problem situation.

17. The method according to claim 16, wherein said search result is a concept.

18. The method according to claim 16, wherein said step of generating a computer displayable graphical representation of a computer formulated problem statement further comprises:

receiving a characteristic;

storing said characteristic in a template; and applying said template to said problem situation to generate said problem statement.

19. The method according to claim 18, further comprising:

formulating a parameter and an object or process name based on said characteristic.

20. The method according to claim 16, wherein the step of generating a computer viewable graphical representation of a second alternative problem statement further comprises:

receiving a selection of one or more of said operation axis or said hierarchy axis.

21. The method according to claim 16, further comprising:

generating an ontology query based on said query; and searching said database based on said ontology query.

22. The method according to claim 16, wherein said problem statement identifies an event.

23. The method according to claim 22, wherein said cause-and-effect axis describes a causal relationship between one or more necessary or sufficient events causing said event.

24. The method according to claim 22, wherein said operation axis describes a relationship between one or more operations that take place before or after said event.

25. The method according to claim 22, wherein said hierarchy axis describes a relationship between a hierarchy of one or more subsystems or super-systems that relate to a cause of said event.

* * * * *